(12) United States Patent
Sedukhin et al.

(10) Patent No.: US 8,225,308 B2
(45) Date of Patent: Jul. 17, 2012

(54) MANAGING SOFTWARE LIFECYCLE

(75) Inventors: Igor Sedukhin, Issaquah, WA (US);
Daniel Eshner, Issaquah, WA (US);
Erik B. Christensen, Seattle, WA (US);
Amol Sudhakar Kulkarni, Bothell, WA
(US); Prasad Sripathi Panditharadhya,
Sammamish, WA (US); **Girish Mittur
Venkataramanappa**, Redmond, WA
(US); Vladimir Pogrebinsky,
Sammamish, WA (US); **Haoran Andy
Wu**, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 11/925,680

(22) Filed: Oct. 26, 2007

(65) Prior Publication Data
US 2009/0113407 A1 Apr. 30, 2009

(51) Int. Cl.
*G06F 9/44* (2006.01)
*G06F 9/445* (2006.01)
*G06F 15/177* (2006.01)

(52) U.S. Cl. ......... 717/174; 717/104; 717/127; 709/220
(58) Field of Classification Search .................. None
See application file for complete search history.

(56) References Cited

U.S. PATENT DOCUMENTS

| | | |
|---|---|---|
| 4,751,635 A | 6/1988 | Kret |
| 5,423,003 A | 6/1995 | Berteau |
| 5,602,991 A | 2/1997 | Berteau |
| 5,655,081 A | 8/1997 | Bonnell |
| 5,764,241 A | 6/1998 | Elliott |
| 5,809,266 A | 9/1998 | Touma |
| 5,893,083 A | 4/1999 | Eshghi |
| 5,913,062 A | 6/1999 | Vrvilo et al. |
| 5,937,388 A | 8/1999 | Davis et al. |
| 5,958,010 A | 9/1999 | Agarwal |
| 6,005,849 A | 12/1999 | Roach et al. |
| 6,026,404 A | 2/2000 | Adunuthula |
| 6,055,363 A | 4/2000 | Beals et al. |
| 6,070,190 A | 5/2000 | Reps |
| 6,167,538 A | 12/2000 | Neufeld et al. |

(Continued)

FOREIGN PATENT DOCUMENTS
EP 0733967 9/1996
(Continued)

OTHER PUBLICATIONS

Rosenblum, D., and Wolf, A. A Design Framework for Internet-Scale Event Observation and Notification. ACM SIGSOFT Software Engineering Notes. vol. 22 Issue 6, Nov. 1997. [retrieved on Jun. 12, 2011]. Retrieved from the Internet: <URL:www.acm.org>.*

(Continued)

*Primary Examiner* — Thuy Dao
*Assistant Examiner* — Geoffrey St Leger
(74) *Attorney, Agent, or Firm* — Workman Nydegger

(57) ABSTRACT

The present invention extends to methods, systems, and computer program products for managing software lifecycle. Based on declarative models and knowledge of their interpretation, embodiments of the present invention facilitate lifecycle management for model-based software applications. Lifecycle models, such as, for example, lifecycle state machine models are stored in a shared repository such that executive services can determine how software application lifecycles are to be managed and transitioned. Software lifecycle activities can verify that a transition is possible and identify any errors preventing a lifecycle transition. Model-based error handling and error recovery mechanisms can be used to correct any identified errors.

15 Claims, 7 Drawing Sheets

U.S. PATENT DOCUMENTS

| | | |
|---|---|---|
| 6,225,995 B1 | 5/2001 | Jacobs |
| 6,230,309 B1 | 5/2001 | Turner |
| 6,247,056 B1 | 6/2001 | Chou |
| 6,263,339 B1 | 7/2001 | Hirsch |
| 6,279,009 B1 | 8/2001 | Smirnov et al. |
| 6,330,717 B1 | 12/2001 | Raverdy |
| 6,334,114 B1 | 12/2001 | Jacobs |
| 6,336,217 B1 | 1/2002 | D'Anjou et al. |
| 6,342,907 B1 | 1/2002 | Petty |
| 6,415,297 B1 | 7/2002 | Leymann et al. |
| 6,477,665 B1 | 11/2002 | Bowman-Amuah |
| 6,618,719 B1 | 9/2003 | Andrei |
| 6,640,241 B1 | 10/2003 | Ozzie |
| 6,654,783 B1 | 11/2003 | Hubbard |
| 6,662,205 B1 | 12/2003 | Bereiter |
| 6,697,877 B1 | 2/2004 | Martin |
| 6,710,786 B1 | 3/2004 | Jacobs |
| 6,715,145 B1 | 3/2004 | Bowman-Amuah |
| 6,718,535 B1 | 4/2004 | Underwood |
| 6,801,818 B2 | 10/2004 | Kopcha |
| 6,847,970 B2 | 1/2005 | Kar et al. |
| 6,854,069 B2 | 2/2005 | Kampe |
| 6,886,024 B1 | 4/2005 | Fujita |
| 6,907,395 B1 | 6/2005 | Hunt |
| 6,931,644 B2 | 8/2005 | Riosa |
| 6,934,702 B2 | 8/2005 | Faybishenko |
| 6,941,341 B2 | 9/2005 | Logston |
| 7,051,098 B2 | 5/2006 | Masters |
| 7,055,143 B2 | 5/2006 | Ringseth et al. |
| 7,065,579 B2 | 6/2006 | Traversat |
| 7,072,807 B2 | 7/2006 | Brown |
| 7,072,934 B2 | 7/2006 | Helgeson |
| 7,079,010 B2 | 7/2006 | Champlin |
| 7,085,837 B2 | 8/2006 | Kimbrel |
| 7,096,258 B2 | 8/2006 | Hunt |
| 7,103,874 B2 | 9/2006 | McCollum |
| 7,130,881 B2 | 10/2006 | Volkov et al. |
| 7,150,015 B2 | 12/2006 | Pace et al. |
| 7,155,380 B2 | 12/2006 | Hunt |
| 7,155,466 B2 | 12/2006 | Rodriguez |
| 7,162,509 B2 | 1/2007 | Brown et al. |
| 7,168,077 B2 | 1/2007 | Kim |
| 7,174,359 B1 | 2/2007 | Hamilton, II et al. |
| 7,178,129 B2 | 2/2007 | Katz |
| 7,200,530 B2 | 4/2007 | Brown |
| 7,210,143 B2* | 4/2007 | Or et al. ........................ 717/174 |
| 7,219,351 B2 | 5/2007 | Bussler et al. |
| 7,263,689 B1 | 8/2007 | Edwards et al. |
| 7,379,999 B1 | 5/2008 | Zhou et al. |
| 7,383,277 B2* | 6/2008 | Gebhard et al. ...................... 1/1 |
| 7,395,526 B2* | 7/2008 | Arcand ........................ 717/127 |
| 7,487,080 B1 | 2/2009 | Tocci |
| 7,512,707 B1 | 3/2009 | Manapragada |
| 7,526,734 B2* | 4/2009 | Vasilev et al. ................. 715/805 |
| 7,703,075 B2 | 4/2010 | Das |
| 7,747,985 B2* | 6/2010 | Campbell et al. ............. 717/127 |
| 7,761,844 B2 | 7/2010 | Bove |
| 7,796,520 B2 | 9/2010 | Poustchi |
| 7,797,289 B2 | 9/2010 | Chan et al. |
| 7,844,942 B2 | 11/2010 | Eilam |
| 8,122,106 B2* | 2/2012 | Hunt et al. .................... 709/220 |
| 2002/0035593 A1 | 3/2002 | Salim et al. |
| 2002/0038217 A1 | 3/2002 | Young |
| 2002/0099818 A1 | 7/2002 | Russell |
| 2002/0111841 A1 | 8/2002 | Leymann |
| 2002/0120917 A1 | 8/2002 | Abrari et al. |
| 2002/0133504 A1 | 9/2002 | Vlahos et al. |
| 2002/0135611 A1 | 9/2002 | Deosaran |
| 2002/0147515 A1 | 10/2002 | Fava et al. |
| 2002/0147962 A1 | 10/2002 | Hatanaka |
| 2002/0198734 A1 | 12/2002 | Greene |
| 2003/0005411 A1 | 1/2003 | Gerken |
| 2003/0061342 A1 | 3/2003 | Abdelhadi |
| 2003/0084156 A1 | 5/2003 | Graupner et al. |
| 2003/0135384 A1 | 7/2003 | Nguyen |
| 2003/0149685 A1 | 8/2003 | Trossman |
| 2003/0182656 A1 | 9/2003 | Leathers |
| 2003/0195763 A1 | 10/2003 | Gulcu |
| 2003/0208743 A1 | 11/2003 | Chong |
| 2004/0034850 A1 | 2/2004 | Burkhardt |
| 2004/0046785 A1 | 3/2004 | Keller |
| 2004/0078461 A1 | 4/2004 | Bendich et al. |
| 2004/0088350 A1 | 5/2004 | Early |
| 2004/0102926 A1 | 5/2004 | Adendorff |
| 2004/0148184 A1 | 7/2004 | Sadiq |
| 2004/0162901 A1 | 8/2004 | Mangipudi |
| 2004/0249972 A1 | 12/2004 | White |
| 2005/0005200 A1 | 1/2005 | Matena et al. |
| 2005/0010504 A1* | 1/2005 | Gebhard et al. ................. 705/34 |
| 2005/0011214 A1 | 1/2005 | Ratliff |
| 2005/0055692 A1 | 3/2005 | Lupini |
| 2005/0071737 A1 | 3/2005 | Adendorff |
| 2005/0074003 A1 | 4/2005 | Ball |
| 2005/0091227 A1 | 4/2005 | McCollum et al. |
| 2005/0120106 A1 | 6/2005 | Albertao |
| 2005/0125212 A1 | 6/2005 | Hunt et al. |
| 2005/0132041 A1 | 6/2005 | Kundu |
| 2005/0137839 A1 | 6/2005 | Mansurov |
| 2005/0155042 A1 | 7/2005 | Kolb et al. |
| 2005/0165906 A1 | 7/2005 | Deo et al. |
| 2005/0182750 A1* | 8/2005 | Krishna et al. ..................... 707/1 |
| 2005/0188075 A1 | 8/2005 | Dias |
| 2005/0216831 A1 | 9/2005 | Guzik |
| 2005/0246656 A1* | 11/2005 | Vasilev et al. ................. 715/805 |
| 2005/0251546 A1* | 11/2005 | Pichetti et al. ................ 709/200 |
| 2005/0261875 A1 | 11/2005 | Shrivastava |
| 2005/0268307 A1 | 12/2005 | Gates et al. |
| 2005/0278702 A1 | 12/2005 | Koyfman |
| 2005/0283518 A1 | 12/2005 | Sargent |
| 2006/0010142 A1 | 1/2006 | Kim |
| 2006/0010164 A1 | 1/2006 | Netz |
| 2006/0013252 A1 | 1/2006 | Smith |
| 2006/0036743 A1 | 2/2006 | Deng |
| 2006/0064460 A1 | 3/2006 | Sugawara |
| 2006/0070066 A1 | 3/2006 | Grobman |
| 2006/0070086 A1 | 3/2006 | Wang |
| 2006/0074730 A1 | 4/2006 | Shukla et al. |
| 2006/0074734 A1 | 4/2006 | Shukla |
| 2006/0095443 A1 | 5/2006 | Kumar |
| 2006/0123389 A1 | 6/2006 | Kolawa et al. |
| 2006/0123412 A1 | 6/2006 | Hunt |
| 2006/0155738 A1 | 7/2006 | Baldwin |
| 2006/0161862 A1 | 7/2006 | Racovolis et al. |
| 2006/0173906 A1 | 8/2006 | Chu et al. |
| 2006/0206537 A1 | 9/2006 | Chiang |
| 2006/0206890 A1* | 9/2006 | Shenfield et al. ............. 717/174 |
| 2006/0230314 A1 | 10/2006 | Sanjar |
| 2006/0235859 A1 | 10/2006 | Hardwick |
| 2006/0236254 A1 | 10/2006 | Mateescu |
| 2006/0242195 A1 | 10/2006 | Bove |
| 2006/0265231 A1 | 11/2006 | Fusaro et al. |
| 2006/0277323 A1 | 12/2006 | Joublin |
| 2006/0277437 A1 | 12/2006 | Ohtsuka |
| 2006/0294502 A1 | 12/2006 | Das |
| 2006/0294506 A1 | 12/2006 | Dengler |
| 2007/0005283 A1 | 1/2007 | Blouin |
| 2007/0005299 A1 | 1/2007 | Haggerty |
| 2007/0006122 A1 | 1/2007 | Bailey et al. |
| 2007/0016615 A1 | 1/2007 | Mohan et al. |
| 2007/0033088 A1 | 2/2007 | Aigner et al. |
| 2007/0038994 A1* | 2/2007 | Davis et al. ................... 717/174 |
| 2007/0050237 A1 | 3/2007 | Tien |
| 2007/0050483 A1 | 3/2007 | Bauer et al. |
| 2007/0061775 A1* | 3/2007 | Tanaka .......................... 717/104 |
| 2007/0061776 A1 | 3/2007 | Ryan et al. |
| 2007/0067266 A1 | 3/2007 | Lomet |
| 2007/0088724 A1 | 4/2007 | Demiroski |
| 2007/0089117 A1 | 4/2007 | Samson |
| 2007/0094350 A1 | 4/2007 | Moore |
| 2007/0112847 A1 | 5/2007 | Dublish |
| 2007/0174228 A1 | 7/2007 | Folting |
| 2007/0174815 A1 | 7/2007 | Chrysanthakopoulos et al. |
| 2007/0179823 A1 | 8/2007 | Bhaskaran |
| 2007/0208606 A1 | 9/2007 | Mackay |
| 2007/0220177 A1 | 9/2007 | Kothari |
| 2007/0226681 A1 | 9/2007 | Thorup |
| 2007/0233879 A1 | 10/2007 | Woods |

| | | | |
|---|---|---|---|
| 2007/0244904 | A1 | 10/2007 | Durski |
| 2007/0245004 | A1 | 10/2007 | Chess |
| 2007/0277109 | A1 | 11/2007 | Chen |
| 2007/0283344 | A1* | 12/2007 | Apte et al. ............... 717/174 |
| 2007/0294364 | A1* | 12/2007 | Mohindra et al. ............ 709/217 |
| 2008/0005729 | A1 | 1/2008 | Harvey |
| 2008/0010631 | A1 | 1/2008 | Harvey et al. |
| 2008/0127052 | A1 | 5/2008 | Rostoker |
| 2008/0209414 | A1 | 8/2008 | Stein |
| 2008/0244423 | A1 | 10/2008 | Jensen-Pistorius |
| 2009/0049165 | A1 | 2/2009 | Long et al. |
| 2009/0187662 | A1 | 7/2009 | Manapragada et al. |
| 2009/0197662 | A1 | 8/2009 | Wright |
| 2009/0265458 | A1 | 10/2009 | Baker |
| 2010/0005527 | A1 | 1/2010 | Jeon |
| 2011/0219383 | A1 | 9/2011 | Bhaskar |

FOREIGN PATENT DOCUMENTS

| | | |
|---|---|---|
| EP | 1770510 | 4/2007 |
| WO | WO 00/38091 | 6/2000 |
| WO | 0124003 | 4/2001 |
| WO | WO0227426 A2 | 4/2002 |
| WO | 2007072501 | 6/2007 |

OTHER PUBLICATIONS

Ketfi A., et al., Model-Driven Framework for Dynamic Deployment and Reconfiguration of Component-Based Software Systems, Metainformatics Symposium, Nov. 9-11, 2005, 9 pages, [retrieved on Mar. 6, 2012], Retrieved from the Internet: <URL:http://dl.acm.org/>.*
Eastman, J., et al., Service Lifecycle in a Distributed Computing Environment, IEEE, 1998, pp. 183-184, [retrieved on Mar. 6, 2012], Retrieved from the Internet: <URL:http://ieeexplore.ieee.org/>.*
U.S. Appl. No. 11/925,184, Mail Date Jan. 14, 2011, Office Action.
U.S. Appl. No. 12/105,083, filed Apr. 17, 2008.
U.S. Appl. No. 11/740,737, Mail Date Feb. 10, 2011, Office Action.
Office Action dated Mar. 2, 2010 cited in U.S. Appl. No. 11/771,816.
Office Action dated Mar. 18, 2010 cited in U.S. Appl. No. 11/740,737.
U.S. Appl. No. 11/925,079, Mail Date Mar. 1, 2011, Notice of Allowance.
Office Action dated Apr. 5, 2010 cited in U.S. Appl. No. 11/771,827.
Office Action dated Apr. 13, 2010 cited in U.S. Appl. No. 11/925,326.
U.S. Appl. No. 11/925,184, Mail Date Apr. 25, 2011, Office Action.
U.S. Appl. No. 11/740,737, Mail Date Apr. 29, 2011, Notice of Allowance.
U.S. Appl. No. 11/925,326, Mail Date Jul. 22, 2010, Notice of Allowance.
U.S. Appl. No. 11/925,079, Mail Date Sep. 1, 2010, Office Action.
U.S. Appl. No. 11/740,737, Mail Date Sep. 13, 2010, Office Action.
Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
U.S. Appl. No. 11/844,177, filed Aug. 23, 2007, Sedukhin.
U.S. Appl. No. 11/740,737, filed Apr. 26, 2007, Sedukhin.
U.S. Appl. No. 11/771,827, filed Jun. 29, 2007, Sedukhin.
U.S. Appl. No. 11/771,816, filed Jun. 29, 2007, Sedukhin.
U.S. Appl. No. 11/925,079, filed Oct. 26, 2007, Bhaskar.
U.S. Appl. No. 11/925,326, filed Oct. 26, 2007, Christensen.
U.S. Appl. No. 11/925,591, filed Oct. 26, 2007, Sedukhin.
U.S. Appl. No. 11/925,067, Oct. 26, 2007, Sedukhin.
U.S. Appl. No. 11/925,184, filed Oct. 26, 2007, Voss.
U.S. Appl. No. 11/925,201, filed Oct. 26, 2007, Sedukhin.
U.S. Appl. No. 60/983,117, filed Oct. 26, 2007, Skierkowski.
Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing", Sep. 26, 2003, http://m.students.umkc.edu/mpshxf/Towards_IDC.pdf.
"Managing Complexity in Middleware", by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pages. Retrieved from the Internet: http://222.aosd.net/2005/workshops/acp4is/past/asp4is03/papers/colyer.pdf.
"User Interface Declarative Models and Development Environments: A Survey", by Paulo Pinheiro Da Silva, Department of Computer Science, University of Manchester, Manchester, England [online] [retrieved on Apr. 20, 2007], 20 pages. Retrieved from the Internet: http://www.cs.utep.edu/paulo/papers/PinheirodaSilva_DSVIS_2000.pdf.
"Architecturing and Configuring Distributed Application with Olan", by R. Balter, L. Bellissard, F. Boyer, M Riveill and J.Y. Vion-Dury, Middleware 98 Conference Report, INRIA, France, [online] [retrieved on Apr. 20, 2007], 15 pages. Retrieved from the Internet: http://www.comp.lance.ac.uk/computing/middleware98/papers.html.
"A Load Balancing Module for the Apache Web Server", Author Unknown, [online] [retrieved on Apr. 20, 2007], 9 pgs. Retrived from the Internet: http://www.backhand.org/ApacheCon2000/US/mod_backhand_coursenotes.pdf.
"Performance Tuning and Optimization of J2ee Applications on the Jboss Platform", by Samuel Kounev, Bjorn Weis and Alejandro Duchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04-cmg-JBoss.pdf.
"Outlier Detection for Fine-Grained Load Balancing in Database Clusters", by Jin Chen, Gokul Soundararajan, Madalin Mihailescu and Cristiana Amza, Department of Computer Science, Department of Electrical and Computer Engineering, University of Toronto, [online] [retrieved on Apr. 20, 2007], 10 pgs. Retrieved from the Internet: http://www.cs.toronto.edu/~jinchen/papers/smdb07.pdf.
Dias, M. Bernardine, et al., "A Real-Time Rover Executive Based on Model-Based Reactive Planning" The 7th International Symposium on Artificial Intelligence, Robotics and Automation in Space, May 2003.
Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.
Robinson, William N., "Implementing Rule-based Monitors within a Framework for continuous Requirements Monitoring" Proceedings of the 38th Hawaii International Conference on System Sciences, 2005 IEEE, 10 pages.
Maghraoui, Kaoutar El, et al., "Model Driven Provisionings: Bridging the Gap Between Declarative Object Models and Procedural Provisioning Tools", http://wcl.cs.rpi.edu/papers/middleware06.pdf.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
Alpern, Bowen, et al, "PDS: A Virtual Execution Environment for Software Deployment", 2005, pp. 175-185.
Talcott, Carolyn L., MTCoord 2005 Preliminary Version, "Coordination Models Based on a Formal Model of Distributed Object Reflection", 13 pages.
Leymann, F., et al., "Web Services and Business Process Management", IBM Systems Journal, vol. 41, No. 2, 2002, New Developments in Web Services and E-commerce, 11 pages.
Ivan, A.-A, et al., "Pardonable services: A framework for seamlessly adapting distributed applications to heterogeneous environments", High Performance Distributed Computing, 2002. HPDC-11 2002. Proceedings. 11th IEEE International Symposium, 1 page.

Urban, Susan D., et al., "Active Declarative Integration Rules for Developing Distributed Multi-Tiered Applications", 3 pages.

Bischoff, Urs, et al., "Programming the Ubiquitous Network: A Top-Down Approach" System support for Ubiquitous Computing Workshop (UbiSys'06), Orange County, USA, Sep. 2006, 8 pages.

OSLO>Suite 2006, "OSLO Suite is the leading platform for designing, building and executing adaptive business solutions", http://www.oslo-software.com/en/product.php.

Korb, John T., et al., "Command Execution in a Heterogeneous Environment", 1986 ACM, pp. 68-74.

Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.

Office Action dated Sep. 14, 2009 cited in U.S. Appl. No. 11/740,737.

Office Action dated Oct. 14, 2009 cited in U.S. Appl. No. 11/771,827.

Office Action dated Oct. 1, 2009 cited in U.S. Appl. No. 11/771,816.

Nastel Technologies, Inc., "AutoPilot Business Dashboard Configuration and User's Guide Version 4.4", 2006, AP/DSB 440.001, 82 pages.

TIBCO The Power of Now, "TIBCO BusinessFactor", 2006, 2 pages.

TIBCO, http://www.tibco.com/software/business_activity_monitoring/businessfactor/default.jsp, Copyright 2000-2007, 2 pages.

"Factal:Edge Enlists CMLgroup to Bring Visualization to Business Performance Management Clients", http://extranet.fractaledge.com/News/PressReleases/2006/060829, 2006, 2 pages.

Shaojie Wang, Synthesizing Operating System Based Device Drivers in Embedded Systems, 2003.

U.S. Appl. No. 11/771,827, Mail Date Nov. 29, 2010, Notice of Allowance.

U.S. Appl. No. 11/925,067, Mail Date Dec. 6, 2010, Notice of Allowance.

D. Raymar et al.; End-to-End Model Driven Policy Based Network Management; 2006-computer.org; pp. 1-4.

R.M. Argent et al.; Development of Multi-Framework Model Components; 2004; Citeseer; pp. 1-6.

U.S. Appl. No. 11/925,591, Mail Date Jul. 5, 2011, Office Action.

U.S. Appl. No. 13/077,730, Mail Date Jul. 14, 2011, Office Action.

U.S. Appl. No. 11/925,201, Mail Date Jul. 19, 2011, Notice of Allowance.

Quentin Limbourg et al: "USIXML: A Language Supporting Multipath Development of User Interfaces", Engineering Human Computer Interaction and interactive Systems; [Lecture Notes in Computer Science;;LNCS], Springer-Verlag, Berlin/Heidelberg, vol. 3425, Jun. 30, 2005 pp. 200-220, CP019009959 ISBN: 978-3-540-26097-4.

Pierre-Alain Muller et al., "Platform Independent Web Application Modeling and Development with Netsilon", Software & Systems Modeling, Springer, Berlin, DE, vol. 4, No. 4, Nov. 1, 2005, pp. 424-442, XP019357229, ISSN: 1619-1374.

Wang L J et al: "Abstract Interface Specification Languages for device-independent Interface Design: Classification, Analysis and Challenges", Pervasive Computing and Applications, 2006 1st International Symposium On, IEEE, PI, Aug. 1, 2006, pp. 241-246.

Jean Vanderdonckt ed—Oscar Pastor et al, "A MDA-Compliant Environment for Developing User Interfaces of information Systems", Advanced Information Systems Engineering; [Lecture Notes in Computer Science;;LNCS], Springer-Verlag, Berling, Berlin/Heidelberg, vol. 3520, May 17, 2005, pp. 16-31.

Xiaofeng Yu et al., "Towards a Model Driven Approach to Automatic BPEL Generation", Model Driven Architecture Foundations and Applications; [Lecture Notes in Computer Science;;LNCS], Springer Berlin Heidelberg, vol. 4530, Jun. 11, 2007 pp. 204-218.

Wikipedia, "Declarative Programming", available at wikipedia.org/w/index/php?title=Declarative_Programming&oldid=1645216, Last accessed Jul. 28, 2011, (3 pages).

Notice of Allowance dated Sep. 30, 2011 cited in U.S. Appl. No. 11/925,201.

Notice of Allowance dated Sep. 29, 2011 cited in U.S. Appl. No. 13/077,730.

\* cited by examiner

MANAGING SOFTWARE LIFECYCLE

CROSS-REFERENCE TO RELATED APPLICATIONS

N/A.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs.

In general, distributed application programs comprise components that are executed over several different hardware components. Distributed application programs are often large, complex, and diverse in their implementations. Further, distributed applications can be multi-tiered and have many (differently configured) distributed components and subsystems, some of which are long-running workflows and legacy or external systems (e.g., SAP). One can appreciate, that while this ability to combine processing power through several different computer systems can be an advantage, there are various complexities associated with distributing application program modules.

For example, the very distributed nature of business applications and variety of their implementations creates a challenge to consistently and efficiently manage their lifecycle. The challenge is due at least in part to diversity of implementation technologies composed into a distributed application program. That is, diverse parts of a distributed application program have to behave coherently and reliably. Typically, different parts of a distributed application program are individually and manually made to work together. For example, a user or system administrator creates text documents that describe how and when to deploy and activate parts of an application and what to do when failures occur. Accordingly, it is then commonly a manual task to act on the application lifecycle described in these text documents.

BRIEF SUMMARY

The present invention extends to methods, systems, and computer program products for managing software lifecycle. An executive service receives an application model reference along with a software lifecycle command. The application model reference refers to an application model. The software lifecycle command indicate a software lifecycle transition that is to be applied to a distributed application based on the referenced application model.

The executive service utilizes the application model reference to access the referenced application model. The referenced application model includes a lifecycle model reference referring to a lifecycle model. There referenced application model also includes a lifecycle state attribute configured to store a lifecycle state value indicating the lifecycle state of a distributed application based on the application model.

The executive service utilizes the lifecycle model reference to access the referenced lifecycle model. The referenced lifecycle model defines possible lifecycle state values for the lifecycle state attribute of the application model. The referenced lifecycle model also defines transitions that cause lifecycle state values to change. Each defined transition references a command model that describes how to implement the defined transition.

The executive service activates software lifecycle activities based on the referenced lifecycle model. The executive service accesses the current state value from the lifecycle state attribute. The current state value represents the current lifecycle state of a distributed application based on the application model. The executive service refers to the software lifecycle activities to determine if the distributed application can transition from the current lifecycle state to a new lifecycle state in accordance with the lifecycle transition indicated in the software lifecycle command.

In some embodiments, a lifecycle model is a lifecycle state machine that defines lifecycle states and lifecycle state transitions for transitioning between lifecycle states.

In other embodiments, executive services, a repository, driver services, and monitoring services interoperate to manage the lifecycle of software.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
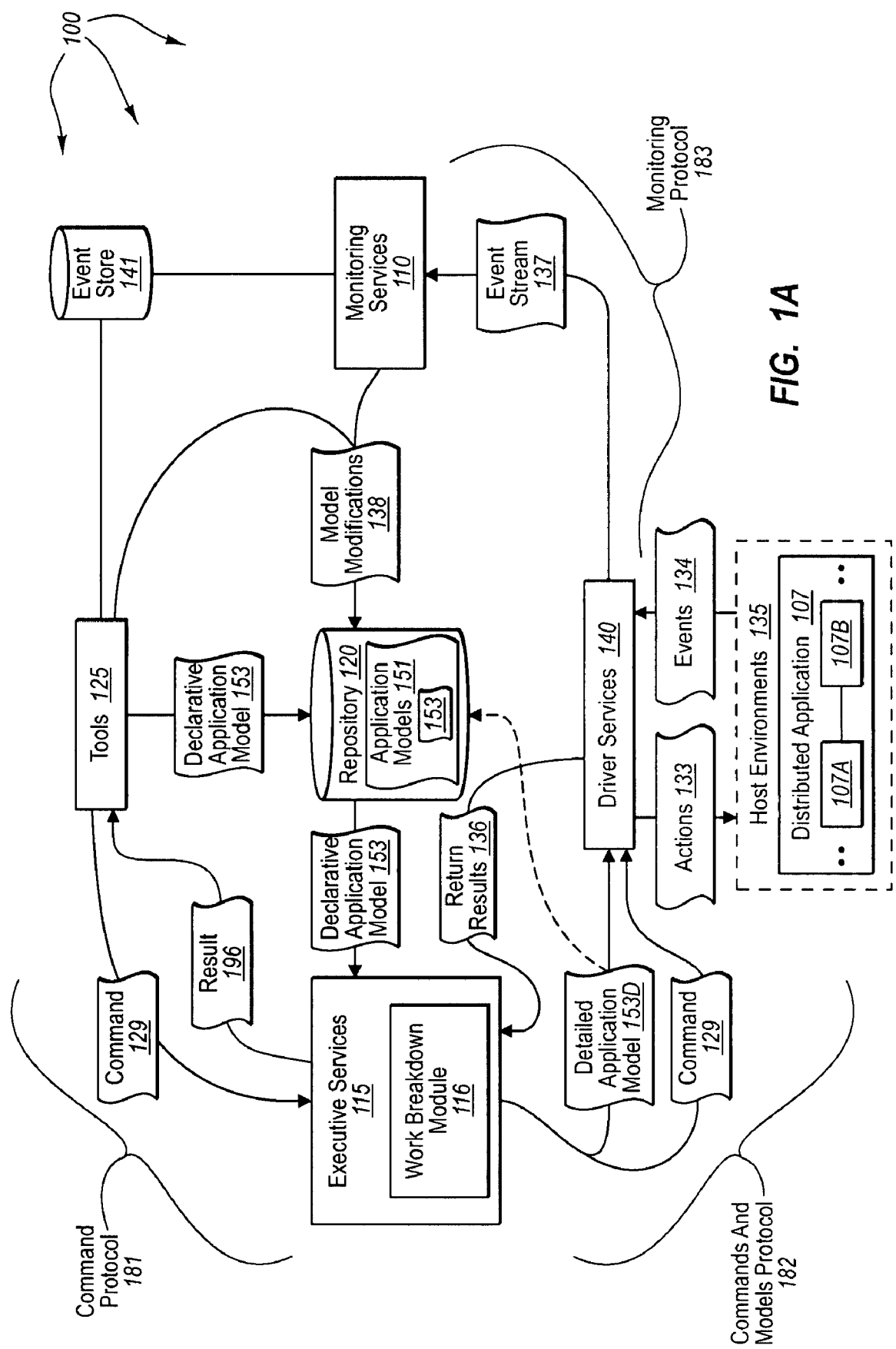
FIGS. 1A-1E collectively illustrate an example computer architecture that facilitates managing software lifecycle.

The present invention extends to methods, systems, and computer program products for managing software lifecycle. An executive service receives an application model reference along with a software lifecycle command. The application model reference refers to an application model. The software lifecycle command indicate a software lifecycle transition that is to be applied to a distributed application based on the referenced application model.

The executive service utilizes the application model reference to access the referenced application model. The referenced application model includes a lifecycle model reference referring to a lifecycle model. There referenced application model also includes a lifecycle state attribute configured to store a lifecycle state value indicating the lifecycle state of a distributed application based on the application model.

The executive service utilizes the lifecycle model reference to access the referenced lifecycle model. The referenced lifecycle model defines possible lifecycle state values for the lifecycle state attribute of the application model. The referenced lifecycle model also defines transitions that cause lifecycle state values to change. Each defined transition references a command model that describes how to implement the defined transition.

The executive service activates software lifecycle activities based on the referenced lifecycle model. The executive service accesses the current state value from the lifecycle state attribute. The current state value represents the current lifecycle state of a distributed application based on the application model. The executive service refers to the software lifecycle activities to determine if the distributed application can transition from the current lifecycle state to a new lifecycle state in accordance with the lifecycle transition indicated in the software lifecycle command.

In some embodiments, a lifecycle model is a lifecycle state machine that defines lifecycle states and lifecycle state transitions for transitioning between lifecycle states.

In other embodiments, executive services, a repository, driver services, and monitoring services interoperate to manage the lifecycle of software.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIGS. 1A-1E collectively illustrate an example computer architecture 100 that facilitates managing software lifecycle. Referring to FIG. 1A, computer architecture 100 includes tools 125, repository 120, executive services 115, driver services 140, host environments 135, monitoring services 110, and events store 141. Each of the depicted components can be connected to one another over a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, tools 125 can be used to write and modify (e.g., through model modifications 138) declarative models for applications and store declarative models, such as, for example, declarative application model 153, in repository 120. Declarative models are used to describe the structure and behavior of real-world running (deployable) applications. Thus, a user (e.g., distributed application program developer) can use one or more of tools 125 to create declarative application model 153.

Generally, declarative models include one or more sets of high-level declarations expressing application intent for a distributed application. Thus, the high-level declarations generally describe operations and/or behaviors of one or more modules in the distributed application program. However, the high-level declarations do not necessarily describe implementation steps required to deploy a distributed application having the particular operations/behaviors (although they can if appropriate). For example, declarative application model 153 can express the generalized intent of a workflow, including, for example, that a first Web service be connected to a database. However, declarative application model 153 does not necessarily describe how (e.g., protocol) nor where (e.g., address) the Web service and database are to be connected to one another. In fact, how and where is determined based on which computer systems the database and the Web service are deployed.

To implement a command for an application based on a declarative model, the declarative model can be sent to executive services 115. Executive services 115 can refine the declarative model until there are no ambiguities and the details are sufficient for drivers to consume. Thus, executive services 115 can receive and refine declarative application model 153 so that declarative application model 153 can be translated by driver services 140 (e.g., by one or more technology-specific drivers) into a deployable application.

Tools 125 and executive services 115 can exchange commands for model-based applications and corresponding results using command protocol 181. Command protocol defines how to request that a command performed on a model by passing a reference to the model. For example, tools 125 can send command 129 to executive services 115 to perform a command for a model based application. Executive services 115 can report result 196 back to tools 125 to indicate the results and/or progress of command 129. Command protocol 181 can also define how to check the status of a command during its execution and after completion or failure. Command protocol 181 can also be used to query error information (e.g., from repository 120) if a command fails.

Accordingly, command protocol 181 can be used to request performance of software lifecycle commands, such as, for example, create, verify, re-verify, clean, deploy, undeploy, check, fix, update, monitor, start, stop, etc., on an application model by passing a reference to the application model. Performance of lifecycle commands can result in corresponding operations including creating, verifying, re-verifying, cleaning, deploying, undeploying, checking, fixing, updating, monitoring, starting and stopping distributed model-based applications respectively.

In general, "refining" a declarative model can include some type of work breakdown structure, such as, for example, progressive elaboration, so that the declarative model instructions are sufficiently complete for translation by drivers 142. Since declarative models can be written relatively loosely by a human user (i.e., containing generalized intent instructions or requests), there may be different degrees or extents to which executive services 115 modifies or supplements a declarative model for a deployable application. Work breakdown module 116 can implement a work breakdown structure algorithm, such as, for example, a progressive elaboration algorithm, to determine when an appropriate granularity has been reached and instructions are sufficient for driver services 140.

Executive services 115 can also account for dependencies and constraints included in a declarative model. For example, executive services 115 can be configured to refine declarative application model 153 based on semantics of dependencies between elements in the declarative application model 153 (e.g., one web service connected to another). Thus, executive services 115 and work breakdown module 116 can interoperate to output detailed declarative application model 153D that provides driver services 140 with sufficient information to realize distributed application 107.

In additional or alternative implementations, executive services 115 can also be configured to refine the declarative application model 153 based on some other contextual awareness. For example, executive services 115 can refine declarative application model based on information about the inventory of host environments 135 that may be available in the datacenter where distributed application 107 is to be deployed. Executive services 115 can reflect contextual awareness information in detailed declarative application model 153D.

In addition, executive services 115 can be configured to fill in missing data regarding computer system assignments. For example, executive services 115 can identify a number of different distributed application program modules in declarative application model 153 that have no requirement for specific computer system addresses or operating requirements. Thus, executive services 115 can assign distributed application program modules to an available host environment on a computer system. Executive services 115 can reason about the best way to fill in data in a refined declarative application model 153. For example, as previously described, executive services 115 may determine and decide which transport to use for an endpoint based on proximity of connection, or determine and decide how to allocate distributed application program modules based on factors appropriate for handling expected spikes in demand. Executive services 115 can then record missing data in detailed declarative application model 153D (or segment thereof).

In addition or alternative implementations, executive services 115 can be configured to compute dependent data in the declarative application model 153. For example, executive services 115 can compute dependent data based on an assignment of distributed application program modules to host environments on computer systems. Thus, executive services 115 can calculate URI addresses on the endpoints, and propagate the corresponding URI addresses from provider endpoints to consumer endpoints. In addition, executive services 115 may evaluate constraints in the declarative application model 153. For example, the executive services 115 can be configured to check to see if two distributed application program modules can actually be assigned to the same machine, and if not, executive services 115 can refine detailed declarative application model 153D to accommodate this requirement.

Accordingly, after adding appropriate data (or otherwise modifying/refining) to declarative application model 153 (to create detailed declarative application model 153D), executive services 115 can finalize the refined detailed declarative application model 153D so that it can be translated by platform-specific drivers included in driver services 140. To finalize or complete the detailed declarative application model 153D, executive services 115 can, for example, partition a declarative application model into segments that can be targeted by any one or more platform-specific drivers. Thus, executive services 115 can tag each declarative application model (or segment thereof) with its target driver (e.g., the address or the ID of a platform-specific driver).

Furthermore, executive services 115 can verify that a detailed application model (e.g., 153D) can actually be translated by one or more platform-specific drivers, and, if so, pass the detailed application model (or segment thereof) to a particular platform-specific driver for translation. For example, executive services 115 can be configured to tag portions of detailed declarative application model 153D with labels indicating an intended implementation for portions of detailed declarative application model 153D. An intended implementation can indicate a framework and/or a host, such as, for example, WCF-IIS, Aspx-IIS, SQL, Axis-Tomcat, WF/WCF-WAS, etc.

After refining a model, executive services 115 can forward the model to driver services 140 or store the refined model back in repository 120 for later use. Thus, executive services 115 can forward detailed declarative application model 153D to driver services 140 or store detailed declarative application model 153D in repository 120. When detailed declarative application model 153D is stored in repository 120, it can be subsequently provided to driver services 140 without further refinements.

Commands and models protocol 182 defines how to request a command to be performed on a model and offers model data to be requested back from a caller. Executive services 115 and driver services 140 can perform requested commands for model-based applications using commands and models protocol 182. For example, executive service 115 can send command 129 and a reference to detailed declarative application model 153D to driver services 140. Driver services 140 can then request detailed declarative application model 153D and other resources from executive services 115 to implement command 129.

Commands and models protocol 182 also defines how command progress and error information are reported back to the caller and how to request that commands be cancelled. For example, driver services 140 can report return result 136 back to executive service 115 to indicate the results and/or progress of command 129.

Driver services 150 can then take actions (e.g., actions 133) to implement an operation for a distributed application based on detailed declarative application model 153D. Driver services 140 interoperate with one or more (e.g., platform-specific) drivers to translate detailed application module 153D (or declarative application model 153) into one or more (e.g., platform-specific) actions 133. Actions 133 can be used to realize an operation for a model-based application.

Thus, distributed application 107 can be implemented in host environments 135. Each application part, for example, 107A, 107B, etc., can be implemented in a separate host environment and connected to other application parts via correspondingly configured endpoints.

Accordingly, the generalized intent of declarative application model 135, as refined by executive services 115 and implemented by drivers accessible to driver services 140, is expressed in one or more of host environments 135. For example, when the general intent of declarative application model is to connect two Web services, specifics of connecting the first and second Web services can vary depending on the platform and/or operating environment. When deployed within the same data center Web service endpoints can be configured to connect using TCP. On the other hand, when the first and second Web services are on opposite sides of a firewall, the Web service endpoints can be configured to connect using a relay connection.

To implement a model-based command, tools 125 can send a command (e.g., command 129) to executive services 115. Generally, a command represents an operation (e.g., a lifecycle state transition) to be performed on a model. Operations include creating, verifying, re-verifying, cleaning, deploying, undeploying, checking, fixing, updating, monitoring, starting and stopping distributed applications based on corresponding declarative models.

In response to the command (e.g., command 129), executive services 115 can access an appropriate model (e.g., declarative application model 153). Executive services 115 can then submit the command (e.g., command 129) and a refined version of the appropriate model (e.g., detailed declarative application model 153D) to driver services 140. Driver services 140 can use appropriate drivers to implement a represented operation through actions (e.g., actions 133). The results (e.g., result 166) of implementing the operation can be returned to tools 125.

Distributed application programs can provide operational information about execution. For example, during execution distributed application can emit events 134 indicative of events (e.g., execution or performance issues) that have occurred at a distributed application.

Monitoring protocol 183 defines how to send events for processing. Driver services 140 and monitoring service 110 can exchange event streams using monitoring protocol 183. In one implementation, driver services 140 collect emitted events and send out event stream 137 to monitoring services 110 on a continuous, ongoing basis, while, in other implementations, event stream 137 is sent out on a scheduled basis (e.g., based on a schedule setup by a corresponding platform-specific driver).

Generally, monitoring services 110 can perform analysis, tuning, and/or other appropriate model modification. As such, monitoring service 110 aggregates, correlates, and otherwise filters data from event stream 137 to identify interesting trends and behaviors of a distributed application. Monitoring service 110 can also automatically adjust the intent of declarative application model 153 as appropriate, based on identified trends. For example, monitoring service 110 can send model modifications 138 to repository 120 to adjust the intent of declarative application model 153. An adjusted intent can reduce the number of messages processed per second at a computer system if the computer system is running low on system memory, redeploy a distributed application on another machine if the currently assigned machine is rebooting too frequently, etc. Monitoring service 110 can store any results in event store 141.

Accordingly, in some embodiments, executive services 115, drivers services 140, and monitoring services 110 interoperate to implement a software lifecycle management system. Executive services 115 implement command and control function of the software lifecycle management system applying software lifecycle models to application models. Driver services 140 translate declarative models into actions to configure and control model-based applications in corresponding host environments. Monitoring services 110 aggregate and correlate events that can be used to reason on the lifecycle of model-based applications.

Figure 1B:
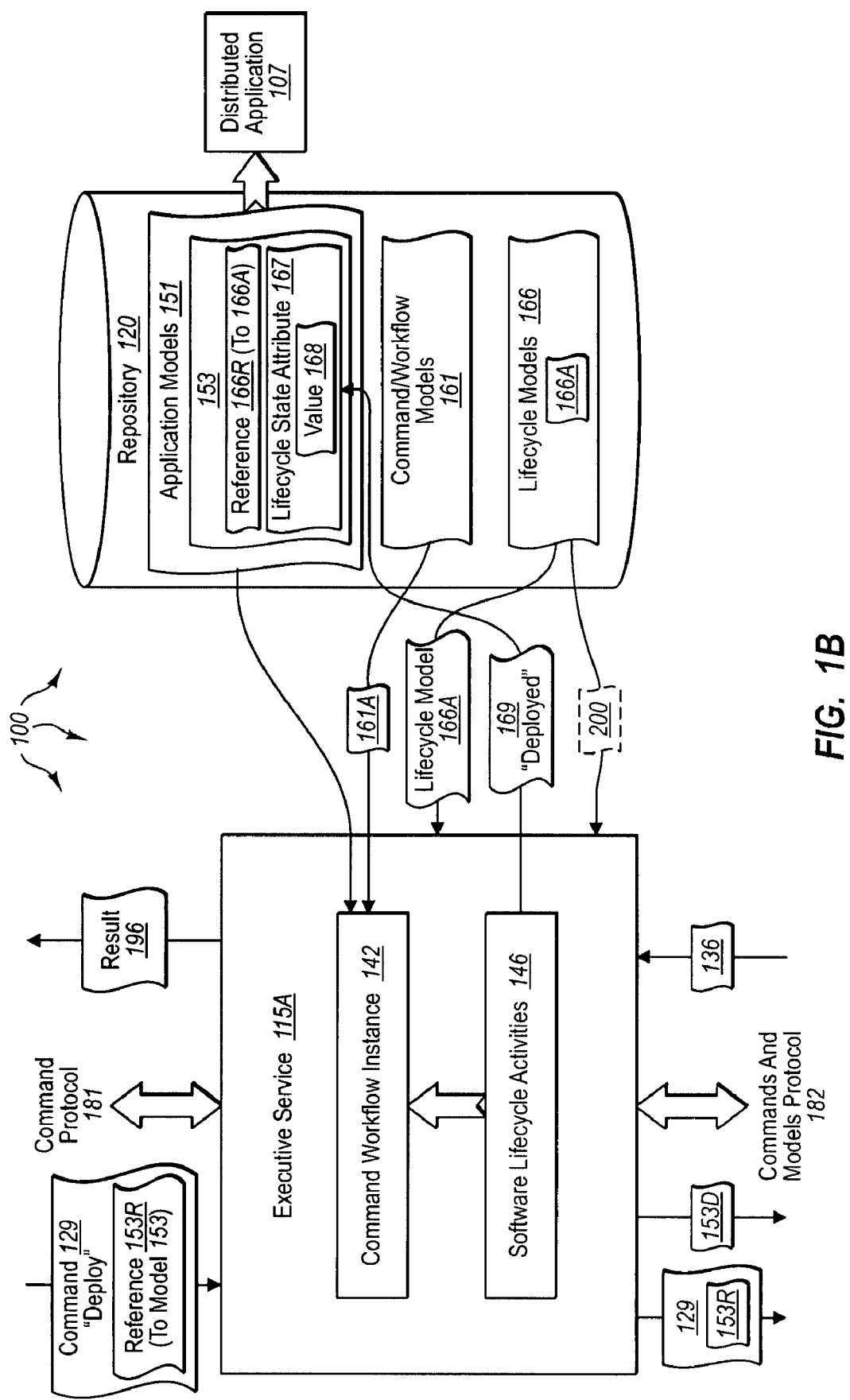

FIG. 1B depicts an expanded view of some of the components of executive services 115 and repository 120. As depicted in FIG. 1B, executive service 115A can be one of a plurality of executive services included in executive services 115. Executive service 115A and repository 120 can interoperate to perform various aspects of software lifecycle management.

In addition to application models 151, repository 120 also stores command/workflow models 161 and lifecycle models 166. Command/workflow models 161 define commands and representative descriptive workflows (e.g., in XML or XAML) of activities for implementing commands.

Lifecycle models define possible lifecycle state values and lifecycle state transitions for model-based applications. Lifecycle models can reference command/workflow models configured to implement commands that perform lifecycle state transitions. Accordingly, executive service 115A can refer to a lifecycle model to identify appropriate command/workflow models for implementing a received lifecycle command for an application model.

An application model can include a reference to a lifecycle model. The referenced lifecycle model can be used to identify commands for performing lifecycle state transitions for the application model. An application model can also include a lifecycle state attribute that indicates the current lifecycle state value (e.g., valid, ready, deployed, running, etc.) of an application based on the application model. For example, as depicted in FIG. 1B declarative application model 153 includes reference 166R to lifecycle model 166A. Reference 166R indicates that lifecycle model 166A is to be accessed to identify command/workflow models for performing lifecycle state transitions for applications based on declarative application model 153. Lifecycle state attribute 167 indicates distributed application 107 has a current lifecycle state value 168.

Generally, executive service 115A can receive a command and model reference and determine what command/workflow instances to create and apply to the referenced application model to attempt to implement the command for the referenced application model. For example, executive service 115A can receive command 129 "Deploy" (a software lifecycle command), which includes reference 153R. In response, executive service 115A can access declarative application model 153. From declarative application model 153, executive service 115A can determine that lifecycle model 166A defines the lifecycle state values and lifecycle state transitions for applications based on declarative application model 153. Executive service 115A can also access the current lifecycle state value 168 from lifecycle state attribute 167.

Based on command 129 "Deploy" (a desired resulting lifecycle state) and the current lifecycle state value 168, executive service 115A can refer to lifecycle model 166 to identify command/workflow models from command/workflow models 161 for transitioning distributed application 107 to a "deployed" state. The identified workflow models can be used to create and apply command workflow instances to declarative application model 153 to attempt to transition distributed application 107 from its current lifecycle state to a "deployed" state. For example, executive service 115A can identify workflow model 161A that can be used to create command workflow instance 142. Depending on the current lifecycle state, one or more command/workflow models can be applied. For example, to transition from an initial state to a deployed state, a transition from the initial state to a ready state and then from the ready state to a deployed state can be implemented.

Command workflow instances can interoperate with software lifecycle management activities 142 when implementing a lifecycle state transition. Software lifecycle management activities 142 can be configured to determine if transition to a desired lifecycle state is possible based on a current lifecycle state. Software lifecycle management activities 142 can be configured to set a current lifecycle state value upon successful implementation of a lifecycle state transition.

Thus upon receiving command 129, software lifecycle activities 142 can determine if transition from current lifecycle sate value 168 to a deployed state is possible. If transition is possible, command workflow instance 142 is applied to declarative application model 153, resulting in distributed application 107 transitioning from current lifecycle state value 168 to a deployed state. Upon successful completion of the transition, software lifecycle activities set lifecycle state attribute 167 to value 169 "deployed".

Command workflow instances and software lifecycle activities 146 can interoperate with work breakdown module 116 to refine a model to a level of detail sufficient for consumption by driver services 140. Command workflow instances can also command drivers (e.g., in driver services 140) to translate models into actions on application parts. Command workflow instances can also record results of command execution and report progress and errors of command execution.

Figure 2:
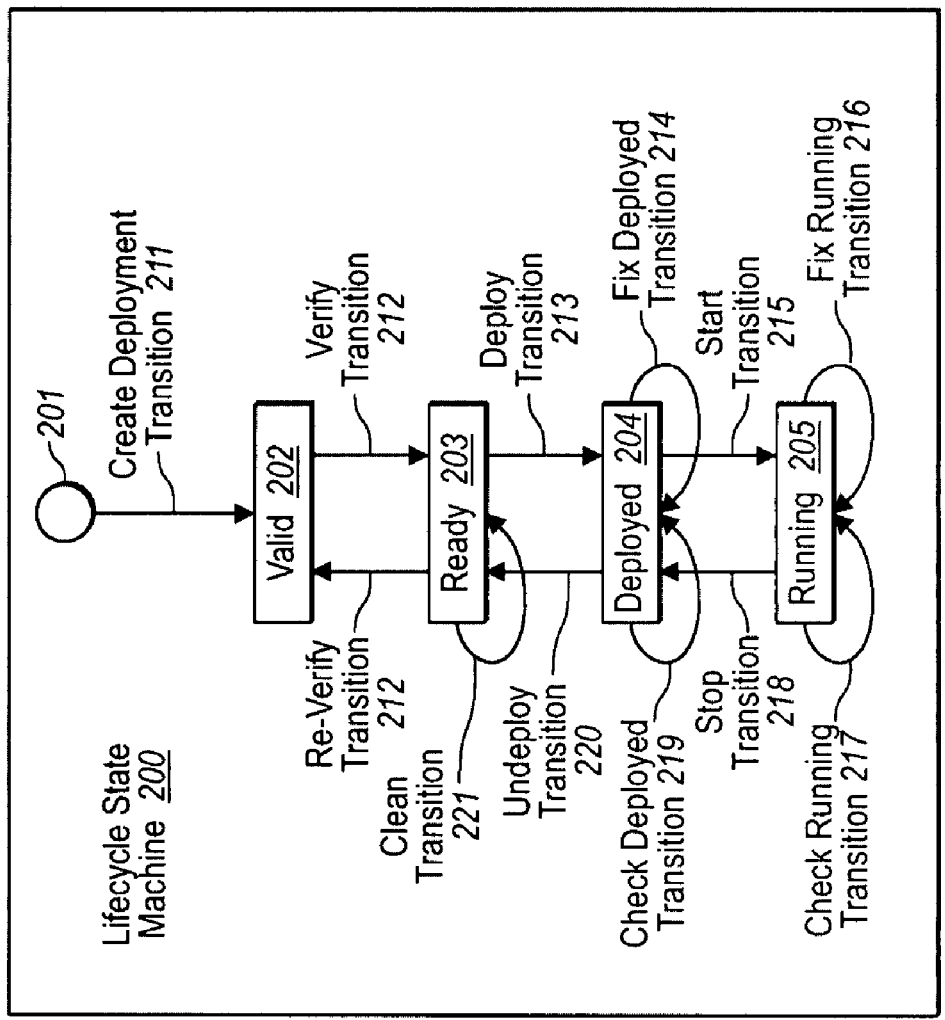
FIG. 2 illustrates an example lifecycle state machine defining software lifecycle states and transitions.

Tools 125 can thus also be used to modify and add lifecycle models in repository 120. In some embodiments, a lifecycle state machine is used for managing application lifecycle using command workflow models for software lifecycle transitions. FIG. 2 illustrates an example lifecycle state machine 206 defining software lifecycle states and transitions. Each depicted transition refers to a command/workflow model that describes how the transition is to be implemented.

Initial state 201 is the state of an application model before configuration for processing by drivers. Create deployment transition 211 attempts to configure the application model for deployment to hosts. In some embodiments, application deployment models (e.g. more refined and detailed models, such as, for example, 153D) are created based on application models that declare intent of configuration and allocation of application parts to hosts. Thus, commands that request Create Deployment transition carry a reference to application models of this kind. Successful implementation of create deployment transition 211 transitions an application model to valid state 202.

Valid state 202 is the state of an application that is sufficiently refined for deployment to hosts. Verify transition 212 attempts to verify an application model against the current state of hosts and their configuration. Successful implementation verify transition 212 transitions an application model to ready state 203.

Ready state 203 is the state of an application that is verified for deployment to hosts. Deploy transition 213 attempts to create and configure application parts in their respective hosts. Successful implementation of a deploy transition 213 transitions an application model to deployed state 204. Clean transition 221 attempts to removal of any residue of application parts in their respective hosts. Clean can be used after an unsuccessful deploy transition 213. Re-verify transition 222 attempts to transition an application back to valid state such that it can be verified again. Successful implementation of re-verify transition 223 transitions an application model to valid state 212.

Deployed state 204 is the state of an application model when application parts for the application model are created and configured in their respective hosts. Start transition 205 attempts to allow application parts for activation. Successful implementation of start transition 205 transitions an application model to running state 205. Undeploy transition 220 attempts to remove of application parts from their respective hosts. Successful implementation of undeploy transition 220 transitions an application model to ready state 203. Fix deployed transition 214 attempts to configure application parts and hosts according to the application model. Check deployed transition 219 attempts to verify the current state of application parts and hosts relative to the application model.

Running state 205 is the state of an application model when application parts are activated within their hosts. Stop transition 218 attempts to disallow application parts for activation and attempts to terminate currently active application parts. Successful implementation of stop transition 218 transitions an application model to ready state 203. Fix running transition 215 attempts to insure that running application parts and hosts are configured according to the application model. Check running transition attempts to verify the current state of running application parts and hosts relative to the application model.

As previously described, each depicted transition refers to a command/workflow model that describes how the transition is to be implemented. Thus, executive service 115A can refer to lifecycle state machine 200 to identify commands for transition form one lifecycle state to another. For example, it may be that an application model is in a ready state and executive service 115A receives a "deploy" command for the application. In response, executive service 115A can refer to lifecycle state machine 200 to determine that a command workflow instance corresponding to deploy transition 213 is to be applied to the application model to transition the application to a deployed state.

Figure 1C:
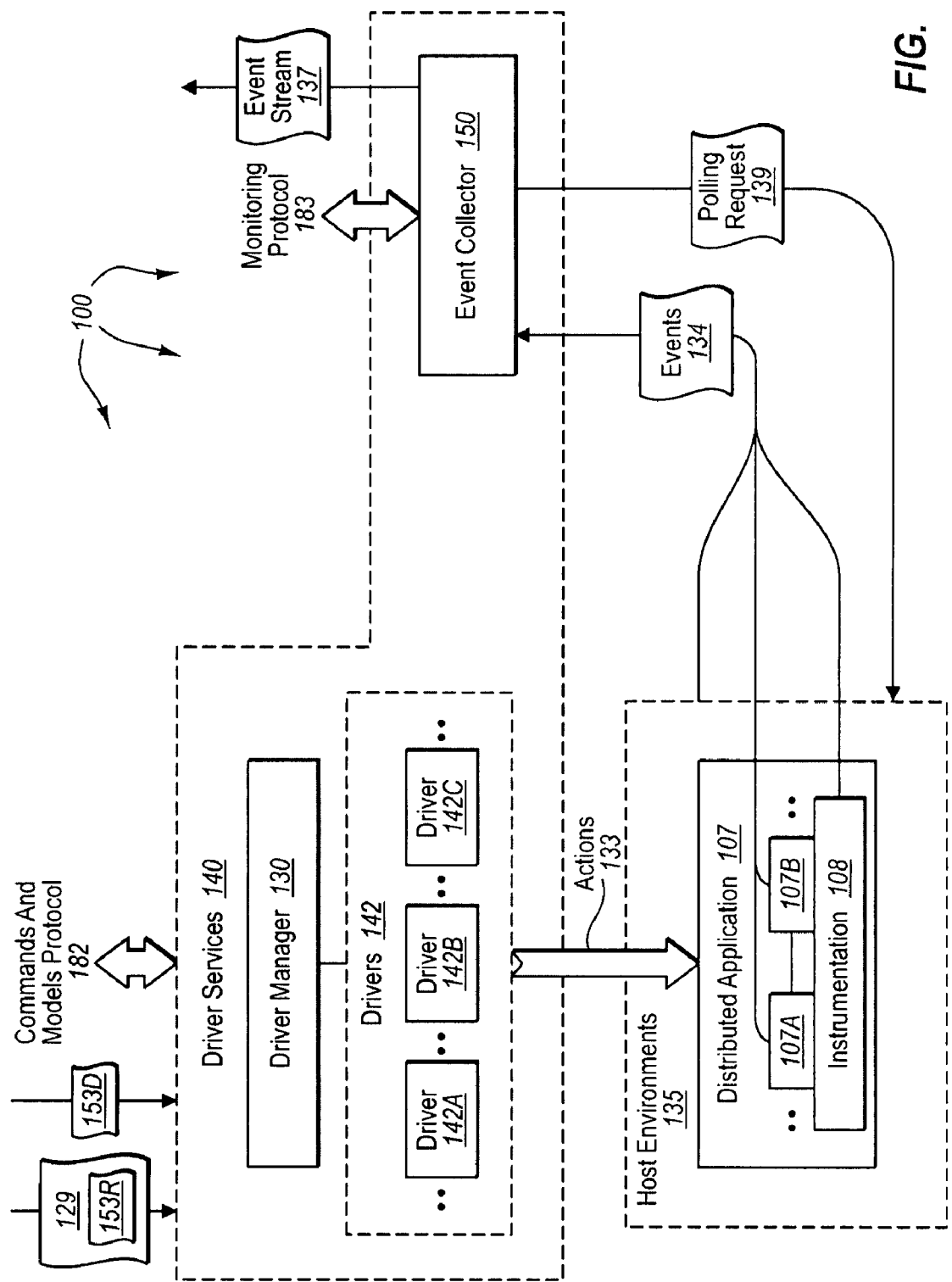

FIG. 1C depicts an expanded view of some of the components of driver services 140. As depicted drives services 140, include driver manager 130 and event collector 150. When driver manager 130 receives a command, it establishes a mechanism to call back for a referenced mode using commands and models protocol 182. Driver manager 130 also verifies that no other commands are in progress on the referenced model. Thus, driver manager 130 can receive command 129, and then call back to executive services 115 for declarative application model 153. Driver manager 130 can also verify that no other commands are in progress on model 153. In response to the callback, driver manager 130 can receive detailed declarative application model 153D.

Driver manager 130 communicates with drivers 142 to identify a driver, such as, for example, any of drivers 142A, 142B, and 142C, capable of translating detailed declarative application model 153D. Based on command 129, the identified driver can translate detailed declarative application model 153D into actions 133 for implementing distributed application 107 in host environments 135. For example, a "Deploy" command causes the identified driver to create and configure application parts 107A, 107B, etc., in hosting environments 135 according to the intent declared in detailed declarative application model 153D.

The identified driver can also inject instrumentation into host environments 135 or application parts of distributed application 107 in accordance with the intent declared in detailed declarative application model 153D. As depicted, instrumentation 108 can be injected across application parts 107A and 107B. For example, if detailed declarative application model 153D indicates that an event is emitted whenever a purchase order is received by a Web service, an appropriate message interceptor is configured on a Web service application part.

Events 134 from application parts 107A, 107B, etc., hosts environments 135, and instrumentation 108 can be sent to event collector 150. In some embodiments, events are pushed to event collector 150. Alternately or in combination with pushed event data, event data can be accumulated within the scope of 107A, 107B, etc., hosts environments 135, and instrumentation 108 or other systems on a computer (e.g., Windows Performance Counters). Event collector can poll (e.g., using polling request 139) for accumulated event data periodically. Event collector 140 then forwards events 134 in event stream 137 to monitoring services 110.

Figure 1D:
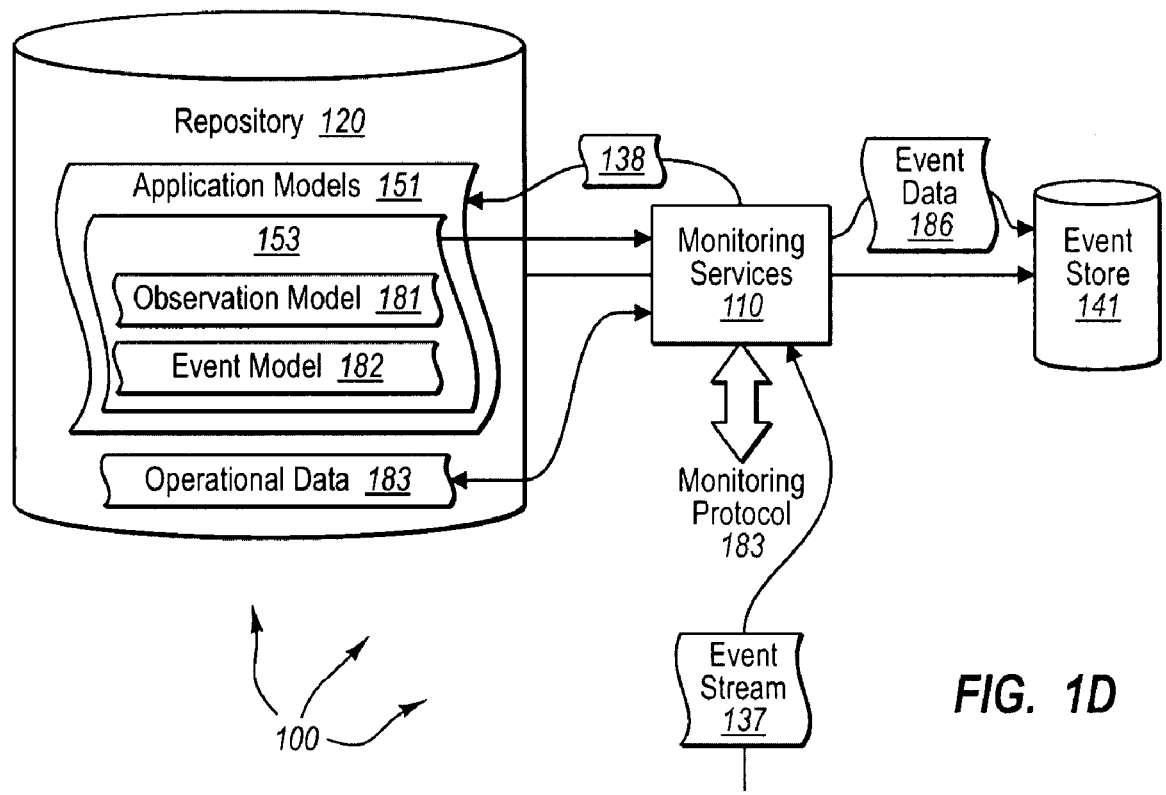

FIG. 1D depicts an expanded view of some of the contents of repository 120 in relation to monitoring services 110. Generally, monitoring service 110 process events, such as, for example, event stream 137, received from driver services 140.

As depicted, declarative application model 153 includes observation model 181 and event model 182. Generally, event models define events that are enabled for production by driver services 140. For example, event model 182 defines particular events enabled for production by driver services 140 when translating declarative application model 153. Generally, observation models refer to event models for events used to compute an observation. For example, observation model 182 can refer to event model 181 for events used to compute an observation of declarative application model 153. Observation models can also combine events from a plurality of event models. For example in order to calculate average latency of completing purchase orders, "order received" and "order completed" events may be needed. Observation models can also refer to event stores (e.g., event store 141) to deposit results of computed observations. For example an observation model may describe that the average latency of purchase orders should be saved every one hour.

When a monitoring service 110 receives an event, it uses the event model reference included in the received event to locate observation models defined to use this event. The located observation models determine how event data is computed and deposited into event store 141.

Figure 1E:
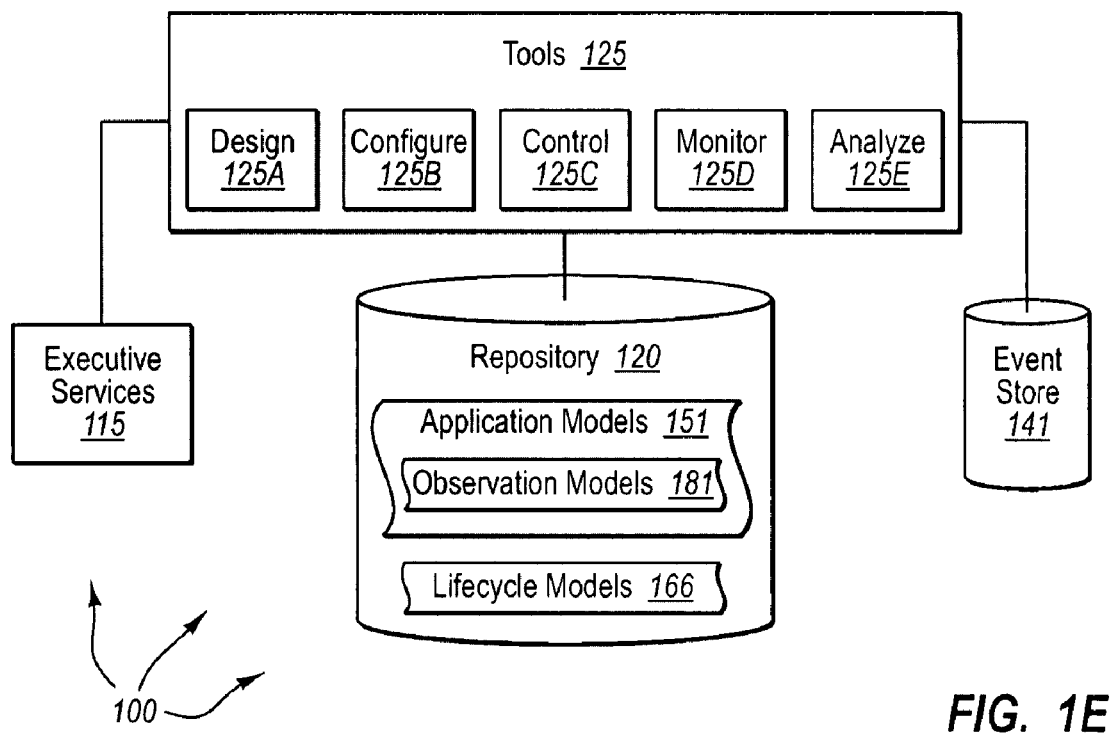

FIG. 1E depicts an expanded view of some of the components of tools 125 in relation to executive services 115, repository 120, and event store 141. As depicted tools 125 includes a plurality of tools, including design 125A, configure 125B, control 125C, monitor 125D, and analyze 125E. Each of the tools is also model driven. Thus, tools 125 visualize model data and behave according to model descriptions.

Tools 125 facilitate software lifecycle management by permitting users to design applications and describe them in models. For example, design 125A can read, visualize, and write model data in repository 120. Tools 125 can also configure applications by adding properties to models and allocating application parts to hosts. For example, configure tool 125B can add properties to models in repository 120. Tools 125 can also deploy, start, stop applications. For example, control tool 125C can deploy, start, and stop applications based on models in repository 120.

Tools 125 can monitor applications by reporting on health and behavior of application parts and their hosts. For example, monitor tool 125D can monitor applications running in host environments 135, such as, for example, distributed application 107. Tools 125 can also analyze running applications by studying history of health, performance and behavior and projecting trends. For example, analyze tool 125E can analyze applications running in host environments 135, such as, for example, distributed application 107. Tools 125 can also, depending on monitoring and analytical indications, optimize applications by transitioning application to any of the lifecycle states or by changing declarative application models in the repository.

Similar to other components, tools 125 use models stored in repository 120 to correlate user experiences and enable transitions across many phases of software lifecycle. Thus, tools 125 can also use software lifecycle models (e.g., 166) in order to determine phase for which user experience should be provided and to display commands available to act on a given model in its current software lifecycle state. As previously described, tools 125 can also send commands to executive services 115. Tools 125 can use observation models (e.g., 181) embedded in application models in order to locate Event Stores that contain information regarding runtime behavior of applications. Tools can also visualize information from event store 141 in the context of the corresponding application model (e.g. list key performance indicators computed based on events coming from a given application).

Accordingly, embodiments of the invention include a system for managing the lifecycle of software that includes one or more tools, one or more executive services, a repository, one or more driver services, and one or more monitoring services.

The repository can be configured to store declarative models and operational data. Declarative models describe intended behaviors that are to occur when the declarative model is implemented in an application. The declarative models can include at least application models and software lifecycle models. Software lifecycle models describing intended behaviors of lifecycle states and lifecycle state transitions in a software lifecycle of an application.

Application models describe intended behaviors of applications and further include an event model and an observation model. Event models define events that can be emitted from an application based on the application model. Observation models define events that are to be used to compute observations related to the application based on the application model and define a store where computed observations can be collected.

Operational data indicates current lifecycle state of applications.

Each executive service is configured to interoperate with the one or more tools to receive a reference to a declarative application model along with a software lifecycle command. The software lifecycle command indicates a software lifecycle transition that is to be applied to a distributed application based on the referenced application model. Each executive service is configured to interoperate with the repository to access the referenced application model from the repository. Each executive service is configured to interoperate with the repository to access a software lifecycle model describing intended behaviors of software lifecycle states and software lifecycle transitions for applications based on the referenced application model.

Each executive service is configured to formulate one or more software lifecycle activities for the distributed application from the software lifecycle model. Each executive service is configured to refine the application model until details of the application model are sufficient for drivers to consume. Each executive service is configured to interoperate with the repository to access operational data for the distributed application. Each executive service is configured to use the one or more software lifecycle activities to determine if the indicating software lifecycle transition is possible for the distributed application based on the accessed operational data.

Each executive service is configured to interoperate with driver services to command drivers to translate the application model into actions on application parts of the distributed application in accordance with semantics of the software lifecycle transition. Each executive service is configured to interoperate with driver services to receive an indication that the software lifecycle transition was successfully implemented for the distributed application. Each executive service is configured to set lifecycle state for the distributed application in response to successful implementation of the software lifecycle transition.

Each driver service is configured to interoperate with executive services to receive commands to translate an application model into actions on application parts of a distributed application in accordance with semantics of a software lifecycle transition. Each driver service is configured to collect events emitted from the distributed application. The emitted events are emitted in accordance with the events model for the application model. Each driver service is configured to interoperate with a monitoring service to transmit an event stream containing the emitted events to the monitoring service.

Each monitor service is configured to interoperate with a driver service to receive an event stream containing emitted events from a distributed application. Each driver service is configured to locate appropriate observation models to determine how to compute operational data from the emitted events. Each driver service is configured to compute operational data for distributed applications from the emitted events in accordance with the appropriate observation models. Each driver service is configured to interoperate with the repository to store the computed operational data for use in subsequent software lifecycle decisions.

Figure 3:
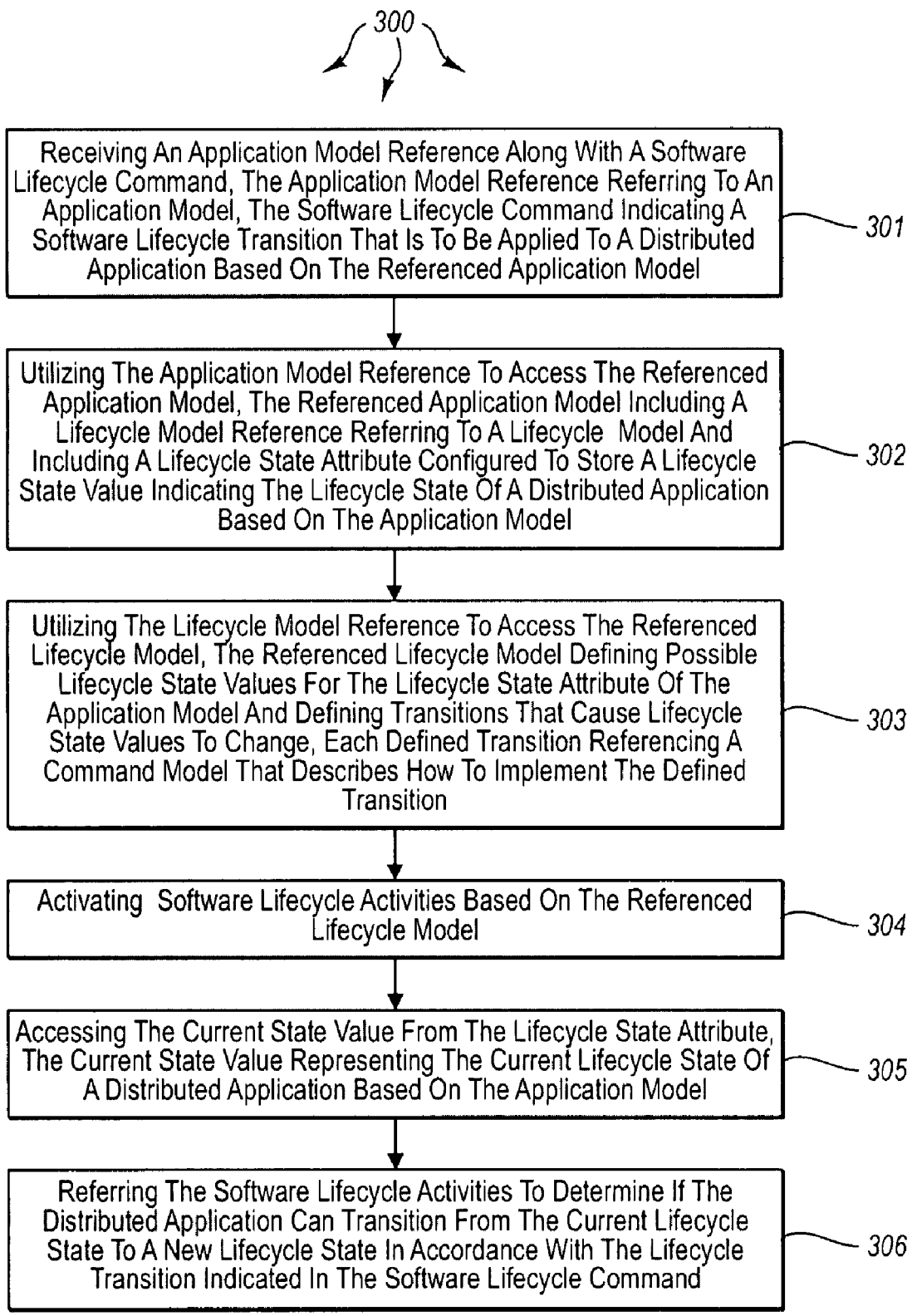
FIG. 3 illustrates a flow chart of an example method for managing the lifecycle of a software application.

FIG. 3 illustrates a flow chart of an example method 300 for managing the lifecycle of a software application. Method 300 will be described with respect to the components and data in computer architecture 100.

Method 300 includes an act of receiving an application model reference along with a software lifecycle command, the application model reference referring to an application model, the software lifecycle command indicating a software lifecycle transition that is to be applied to a distributed application based on the referenced application model (act 301). For example, referring to FIG. 1B, executive service 115A can receive command 129 "Deploy", including reference 153R to application model 153. Command 129 indicates that a software lifecycle transition to a "deployed" state is to be application to distributed application 107.

Method 300 includes an act of utilizing the application model reference to access the referenced application model, the referenced application model including a lifecycle model reference referring to lifecycle model and including a lifecycle state attribute configured to store a lifecycle state value indicating the lifecycle state of a distributed application based on the application model (act 302). For example, executive service 115A can utilize reference 153R to access application model 153. As depicted, model 153 includes reference 166R to lifecycle model 166A and lifecycle state attribute 167 storing value 168. Value 168 indicates the lifecycle state of distributed application 107.

Method 300 includes an act of utilizing the lifecycle model reference to access the referenced lifecycle model, the referenced lifecycle model defining possible lifecycle state values for the lifecycle state attribute of the application model and defining transitions that cause lifecycle state values to change, each defined transition referencing a command model that describes how to implement the defined transition (act 303). For example, executive service 115A can utilize reference 166R to access lifecycle model 166A. Lifecycle model 116A defines possible lifecycles states and lifecycle state transitions for distributed application 107. Each defined lifecycle transition references a command/workflow model that describes how to implement the defined lifecycle transition.

Method 300 includes an act of activating software lifecycle activities based on the referenced lifecycle model (act 304). For example, executive service 115A can activate software lifecycle activities 146. Method 300 includes an act of accessing the current state value from the lifecycle state attribute, the current state value representing the current lifecycle state of a distributed application based on the application model (act 305). For example, executive service 115A can access value 168 from lifecycle state attribute 167. Value 168 indicates the current lifecycle state (e.g., valid, ready, deployed, running, etc.) of distributed application 107.

Method 300 includes an act of referring the software lifecycle activities to determine if the distributed application can transition from the current lifecycle state to a new lifecycle state in accordance with the lifecycle transition indicated in the software lifecycle command (act 306). For example, executive service 115A can refer to software lifecycle activities 146 to determine if distributed application 107 can transition from its current lifecycle state to a "Deployed" state. If it can transition, executive service can instantiate command workflow instance 142 to implement the transition to a "deployed" state.

Embodiments of the invention thus facilitate the use of virtually any lifecycle model to manage software lifecycle states and software lifecycle state transitions for distributed applications. Virtually any number and/or type of lifecycle states and lifecycle state transitions can be described and/or defined for a model-based distributed application. An application model can then refer to an appropriate lifecycle model (e.g., through an attribute value inserted by a developer) to manage software lifecycle state and software lifecycle state transitions for distributed applications based on the application model. In some embodiments, a lifecycle model includes a lifecycle state machine model (e.g., similar to lifecycle state machine 200) that describes and defines software lifecycle state and software lifecycle state transitions.

Figure 4:
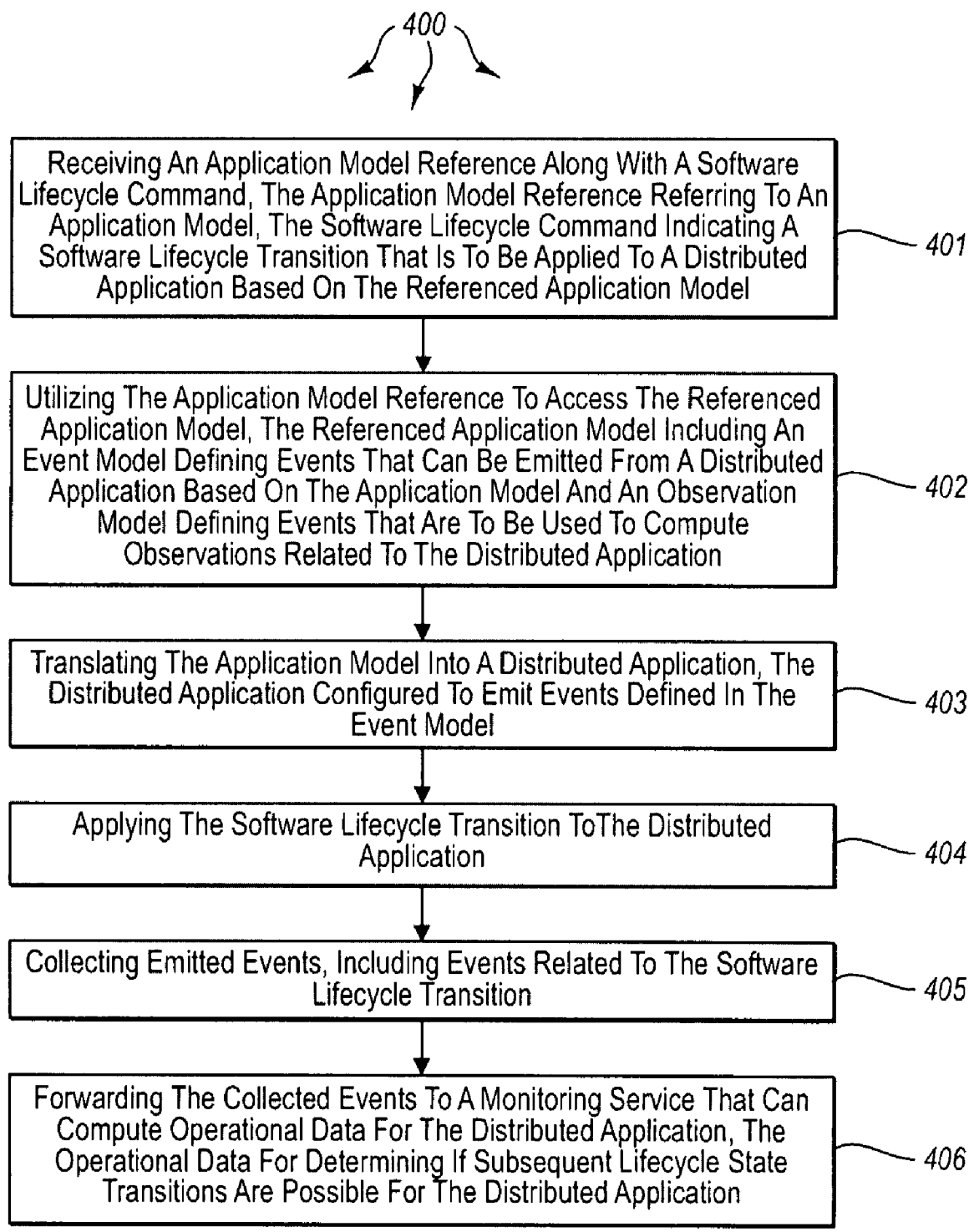
FIG. 4 illustrates a flow chart of another example method for managing the lifecycle of a software application using a lifecycle state machine model.

FIG. 4 illustrates a flow chart of an example method 400 for managing the lifecycle of a software application using a lifecycle state machine model. Method 400 will be described with respect to the components and data in computer architecture 100.

Method 400 includes an act of receiving an application model reference along with a software lifecycle command, the application model reference referring to an application model, the software lifecycle command indicating a software lifecycle transition that is to be applied to a distributed application based on the referenced application model (act 401). For example as previously described, executive service 115A can receive command 129 "Deploy", including reference 153R to application model 153. Command 129 indicates that a software lifecycle transition to a "deployed" state is to be applied to distributed application 107

Method 400 includes an act of utilizing the application model reference to access the referenced application model, the referenced application model including an event model defining events that can be emitted from a distributed application based on the application model and an observation model defining events that are to be used to compute observations related to the distributed application (act 402). For example, referring to FIG. 1D, an executive service (e.g., 115A) can access application mode 151 that includes observation model 181 and event model 182. Event model 182 defines events that can be emitted from distributed application 107. Observation model 181 defines events that are to be used to compute observations related to the distributed application 107.

Method 400 includes an act of translating the application model into a distributed application, the distributed application configured to emit events defined in the event model (act 403). For example, referring now to FIG. 1C, driver services 140 can translate application model 153 into distributed application 107. Method 400 includes an act of applying the software lifecycle transition to the distributed application (act 404). For example, driver services 140 can apply the "deploy" command to distributed application 107.

Method 400 includes an act of collecting emitted events, including events related to the software lifecycle transition (act 405). For example, during transition to a "deployed" state, host environments 135, application parts 107A, 107B, etc., and instrumentation 108 can emit events 134. Event collector 150 can collect events 134. Method 400 includes an act of forwarding the collected events to a monitoring service that can compute operational data for the distributed application, the operational data for determining if subsequent lifecycle state transitions are possible for the distributed application (act 406). For example, referring now to FIG. 1D, event collector 134 can send event stream 137 to monitoring services 110. Monitoring services 110 can generate operational data 183 for determining if subsequent lifecycle transitions for distributed application 107 are possible.

Embodiments of the invention also include various error handling and errors recovery mechanism. Errors can be detected in a variety of different ways using model-based error handling. If a software lifecycle transition command (e.g., sent to executive services) fails, it reports error information defined by the commands protocol. Event store data (e.g., in event stores 141) can indicate errors related to incorrect configuration or abnormal behavior of application parts and their respective hosts. Error correction can be implemented by running express software lifecycle commands (e.g., "verify" or "check") to cause a model to be verified to match reality. Mismatches can generate an error.

Components of computer architecture 100 can reason about errors using references to models that caused errors (e.g., incorrect account name in an application part configuration) to occur. Components can make a variety of decisions when an error is detected. Models can be corrected and transition to the intended software lifecycle state continued. Hosts and their environments can be corrected and transition to the intended software lifecycle state continued.

It can be determined that that correcting models is impossible. As a result an application can remain in a current software lifecycle state and application parts residue in hosts and their environment can be removed. It can be determined that and error is irrelevant and an application can remain in a current software lifecycle state. It can be determined that an error is expected. As a result corresponding expected configuration and/or corresponding expected behavior can be included in a model.

Commands that implement software lifecycle transitions are idempotent. Thus, to arrive at the intended software lifecycle state, a software lifecycle transition command that resulted in errors can be executed again (such as after correcting models). Alternatively, express software lifecycle commands (commonly, "clean" or "fix") can be executed while staying in the original software lifecycle state to remove any application parts residue left in hosts after errors. These types of commands are also idempotent and can be run anytime.

Accordingly, based on declarative models and knowledge of their interpretation, embodiments of the present invention facilitate lifecycle management for model-based software applications. Lifecycle models, such as, for example, lifecycle state machine models are stored in a shared repository such that executive services can determine how software application lifecycles are to be managed and transitioned. Software lifecycle activities can verify that a transition is possible and identify any errors preventing a lifecycle transition. Model-based error handling and error recovery mechanisms can be used to correct any identified errors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a repository storing models that describe intended application behavior, executive services for refining models so that drivers can implement model related commands on applications, and driver services for implementing model related commands for applications, a method for managing the lifecycle of a software application, the method comprising:

an act of storing application models in a repository, each application model comprising a declarative model that describes the structure and behavior of a distributed application;

an act of storing command/workflow models in the repository, each command/workflow model defining lifecycle commands for performing a transition between states of the lifecycle of a corresponding distributed application;

an act of storing lifecycle models in the repository, each lifecycle model defining states of a corresponding distributed application including transitions that can be made between the states, each transition including a reference to a command/workflow model that defines commands for implementing the transition;

an act of receiving an application model reference along with a software lifecycle command, the application model reference referring to a first application model that is stored in the repository, the software lifecycle command indicating a software lifecycle transition that is to be applied to a first distributed application;

an act of utilizing the application model reference to access the first application model, the first application model including a lifecycle model reference referring to a first lifecycle model in the repository and including a lifecycle state attribute configured to store a lifecycle state value indicating a current lifecycle state of the first distributed application;

an act of utilizing the lifecycle model reference to access the first lifecycle model, the first lifecycle model defining states of the first distributed application including transitions that can be made between the states, the states including an initial state, a valid state, a ready state, a deployed state and a running state, each defined transition referencing a command/workflow model in the repository that defines commands for implementing the transition;

an act of accessing the lifecycle state attribute in the first lifecycle model to determine the current lifecycle state of the first distributed application, the current lifecycle state comprising one of the initial state, the valid state, the ready state, the deployed state, or the running state;

an act of referring to the first lifecycle model to determine if the first distributed application can transition from the current lifecycle state to a new lifecycle state in accordance with the lifecycle transition indicated in the received software lifecycle command, the lifecycle command comprising one of a create deployment transition command for transitioning the distributed application from the initial state to the valid state, a verify transition command for transitioning the distributed application from the valid state to the ready state, a deploy transition command for transitioning the distributed application from the ready state to the deployed state, and a start transition command for transitioning the distributed application from the deployed state to the running state;

an act of determining that the first lifecycle model references a first command/workflow model for transitioning the first distributed application to the new lifecycle state in accordance with the lifecycle transition indicated in the received software lifecycle command;

an act of instantiating a first command/workflow instance from the first command/workflow model; and an act of the first command/workflow instance performing commands to transition the distributed application to the new lifecycle state.

2. The method as recited in claim 1, wherein the declarative model is defined in an XML based language.

3. The method as recited in claim 1, wherein the transitions defined in the first lifecycle model that can be made between the states include verify, deploy, fix deployed, fix running, start, stop, check running, check deployed, undeploy, clean, and re-verify.

4. The method as recited in claim 1, wherein the lifecycle model is a lifecycle state machine.

5. The method as recited in claim 1, wherein the act of referring to the first lifecycle model to determine if the first distributed application can transition from the current lifecycle state to a new lifecycle state comprises an act of referring to software lifecycle activities to check for errors related to applying the lifecycle state transition to the distributed application.

6. The method as recited in claim 5, further comprising:

an act of identifying one or more errors related to applying the lifecycle state transition to the first distributed application;

an act of automatically implementing further software lifecycle commands to correct the one or more errors prior to applying the lifecycle state transition to the first distributed application; and an act of sending the received lifecycle command and the first application model to drivers, the drivers configured to translate the software lifecycle command and the first application model into actions to implement the lifecycle state transition for the first distributed application.

7. The method as recited in claim 5, further comprising:

an act of determining that there are no errors related to applying the lifecycle state transition to the first distributed application; and an act of sending the received lifecycle command and the first application model to drivers, the drivers configured to translate the software lifecycle command and the first application model into actions to implement the lifecycle state transition for the first distributed application.

8. The method of claim 1, further comprising:
an act of translating the first application model into the first distributed application, the first distributed application being configured to emit events defined in an event model stored in the repository;
an act of collecting emitted events, including events related to the software lifecycle transition;
an act of forwarding the collected events to a monitoring service that can compute operational data for the first distributed application, the operational data for determining if subsequent lifecycle state transitions are possible for the first distributed application.

9. The method as recited in claim 8, further comprising:
an act of referring to a lifecycle state machine model to identify what the resulting software lifecycle state is to be as a result of applying the software lifecycle transition, prior to translating the first application model.

10. The method as recited in claim 8, wherein the act of translating the first application model into the first distributed application comprises an act of executive services and driver services interoperating in accordance with a commands and models protocol to transfer relevant model related data to the driver services.

11. The method as recited in claim 8, wherein the act of translating the first application model into the first distributed application comprises an act of instrumenting application parts of the first distributed application to emit events in accordance with the event model.

12. The method as recited in claim 8, wherein the act of collecting emitted events, including events related to the software lifecycle transition comprises an event collector polling for accumulated events from the first distributed application.

13. The method as recited in claim 8, further comprising:
an act of the monitoring service detecting an error in implementation of the software lifecycle command.

14. The method as recited in claim 13, further comprising:
an act of automatically implementing a further software lifecycle command to correct the detected error; and
an act of re-applying the software lifecycle transition to the first distributed application.

15. A system for managing the lifecycle of software, the system comprising one or more processors and one or more computer storage media storing computer executable instructions which when executed by the one or more processors perform the following acts:
an act of storing application models in a repository, each application model comprising a declarative model that describes the structure and behavior of a distributed application;
an act of storing command/workflow models in the repository, each command/workflow model defining lifecycle commands for performing a transition between states of the lifecycle of a corresponding distributed application;
an act of storing lifecycle models in the repository, each lifecycle model defining states of a corresponding distributed application including transitions that can be made between the states, each transition including a reference to a command/workflow model that defines commands for implementing the transition;
an act of receiving an application model reference along with a software lifecycle command, the application model reference referring to a first application model that is stored in the repository, the software lifecycle command indicating a software lifecycle transition that is to be applied to a first distributed application;
an act of utilizing the application model reference to access the first application model, the first application model including a lifecycle model reference referring to a first lifecycle model in the repository and including a lifecycle state attribute configured to store a lifecycle state value indicating a current lifecycle state of the first distributed application;
an act of utilizing the lifecycle model reference to access the first lifecycle model, the first lifecycle model defining states of the first distributed application including transitions that can be made between the states, the states including an initial state, a valid state, a ready state, a deployed state and a running state, each defined transition referencing a command/workflow model in the repository that defines commands for implementing the transition;
an act of accessing the lifecycle state attribute in the first lifecycle model to determine the current lifecycle state of the first distributed application, the current lifecycle state comprising one of the initial state, the valid state, the ready state, the deployed state, or the running state;
an act of referring to the first lifecycle model to determine if the first distributed application can transition from the current lifecycle state to a new lifecycle state in accordance with the lifecycle transition indicated in the received software lifecycle command, the lifecycle command comprising one of
a create deployment transition command for transitioning the distributed application from the initial state to the valid state,
a verify transition command for transitioning the distributed application from the valid state to the ready state,
a deploy transition command for transitioning the distributed application from the ready state to the deployed state, and
a start transition command for transitioning the distributed application from the deployed state to the running state;
an act of determining that the first lifecycle model references a first command/workflow model for transitioning the first distributed application to the new lifecycle state in accordance with the lifecycle transition indicated in the received software lifecycle command;
an act of instantiating a first command/workflow instance from the first command/workflow model; and
an act of the first command/workflow instance performing commands to transition the distributed application to the new lifecycle state.

* * * * *